J. M. SARGENT.
TRAP NEST.
APPLICATION FILED NOV. 16, 1912.
1,117,524.
Patented Nov. 17, 1914.
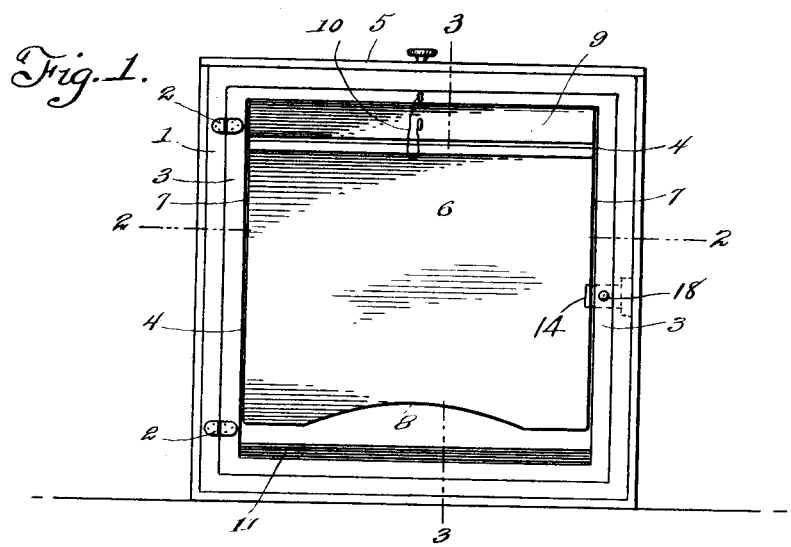
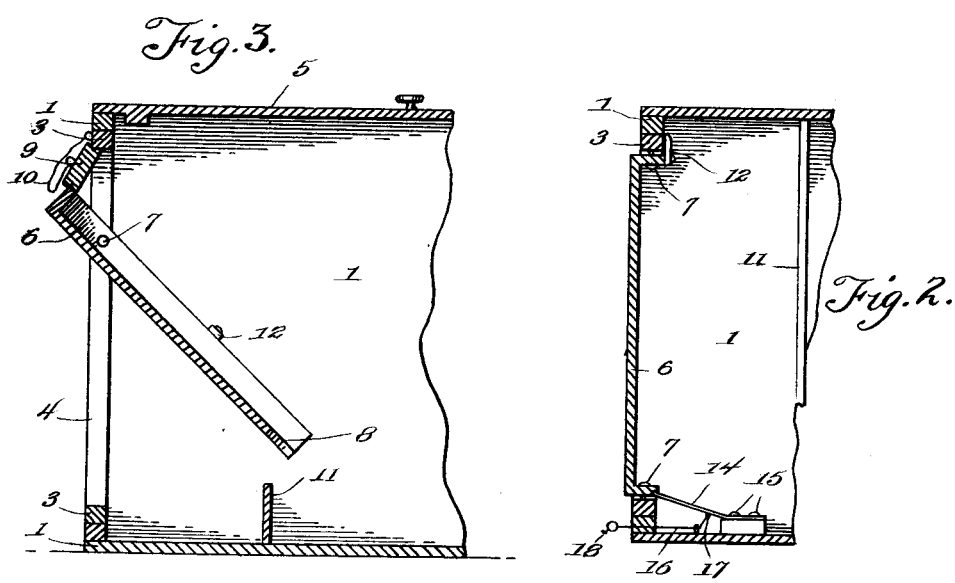
WITNESSES
INVENTOR
John M. Sargent,
by Richard P. Given
his Attorney

UNITED STATES PATENT OFFICE.

JOHN M. SARGENT, OF ELMIRA, NEW YORK.

TRAP-NEST.

1,117,524.  Specification of Letters Patent.  Patented Nov. 17, 1914.

Application filed November 16, 1912. Serial No. 731,868.

*To all whom it may concern:*

Be it known that I, JOHN M. SARGENT, a citizen of the United States, residing at Elmira, in the county of Chemung and State of New York, have invented new and useful Improvements in Trap-Nests, of which the following is a specification.

This invention relates to the class of traps and more particularly to that type known as trap nest, to be used in connection with poultry yards and the like.

An object of my invention is to provide a poultry trap nest which shall be not only simple and durable in construction, but reliable and efficient in operation, and one which can be manufactured and placed upon the market at a minimum cost.

A further object of my invention is to provide a trap nest of the character described, which is capable of being easily and quickly set in such a novel and peculiar manner as to be automatically sprung by the entrance of a fowl into the nest.

It is well known that trap nests have been provided for this purpose, but such nests as have heretofore been devised are either complicated in construction, therefore expensive in their manufacture, or are incapable of performing the functions required thereof, and are quite often accidentally sprung when it is not intended that they should be. Therefore, it is to overcome these and various other objectionable features that I have devised my improved nest which can only be operated by the entrance therein of a fowl.

With the foregoing and other objects in view, my invention relates to such details of construction and in the arrangement and combination of the several parts as will be hereinafter more fully described and specifically pointed out in the appended claims.

In describing my invention in detail, reference will be had to the accompanying drawings, wherein like characters denote like or corresponding parts throughout the several views, and in which:—

Figure 1 is a front elevation of the nest. Fig. 2 is a section on the line 2—2, Fig. 1, and Fig. 3 is a section on the line 3—3, Fig. 1.

Referring now more particularly to the drawings, wherein is illustrated the preferred form of my invention, the numeral 1 designates the body portion of the nest to which is hingedly connected as at 2, a suitable door frame 3, which frame is provided with an opening 4 through which the fowl passes when entering the nest. A lid or cover 5 is also provided, so that access may be had to the body portion or interior of the nest for the removal of the fowl when desired.

The means employed for trapping the fowl comprises a trap door 6 pivotally connected as at 7 within the opening 4 of the door frame 3 and is provided with a cut-out portion 8 at its lower extremity to facilitate and encourage the entrance of the fowl into the nest. When it is desired that the trap should be set, the door 6 is swung inwardly far enough to admit a trigger 9 suspended by means of a chain or cord 10 from the top of the hinged door frame 3, to be placed between the top of the door 6 and the top of said frame 3, the weight of the pivoted door being sufficient to hold the trigger in its proper place. An upright member or projection 11 is placed within and across the nest near its entrance, so that the back of a fowl when entering will be forced against the lower extremity of the door 6 thereby slightly raising same, in which event, the space between the door and door frame is enlarged enough to permit the trigger 9 to drop out of place. By this operation, the weight of the door will cause the same to drop until a projection 12 at the side thereof comes in contact with the side of the frame 3, where it is held in such closed position through the medium of a plate spring 14 secured at one side of the nest as at 15 and extending outwardly into the path of the swinging door.

When a re-setting of the nest is required said spring 14 is forced out of engagement with the said door by reason of a cord or wire 16 secured thereto as at 17 and extending to a point 18 upon the exterior of the nest, so that a pull upon this wire will cause the door to swing back enough to clear the spring, as the door is pivoted off of its center, in which event, the door may be again swung inwardly and re-set as previously described.

It will be readily seen that the operation of my device is simple in the extreme, that the interior of the nest is easily accessible for cleaning purposes by reason of the cover and hinged frame; that it cannot be accidentally sprung as is often the case in devices of this character by the alighting or roosting of fowls upon the cover; and that the same may be quickly reset by simply releasing the spring and placing the trigger as heretofore described.

It is thought from the foregoing that the advantages and novel features of my invention will be readily comprehended.

I desire it to be understood that I may make slight changes in the construction and in the arrangement and combination of the several parts, provided such changes fall within the scope of the subjoined claims.

Having thus fully described my invention, what I claim as new and desire to secure by Letters Patent is:—

1. A poultry nest including a body portion, a door frame hingedly connected to one end thereof, a trap door pivotally supported to form a closure for the said door frame, a trigger carried by the said body portion adapted to be interposed between the said door and the door frame to normally maintain the former in set position, and means carried by the said frame to limit the pivotal movement of the door, as and for the purpose set forth.

2. A poultry trap nest including a body portion, a door frame hingedly connected thereto, a trap door pivotally supported within the said frame, the said door being pivoted at a point intermediate its ends, a trigger adapted to be interposed between the upper extremity of the door and the adjacent portion of the door frame to normally maintain the said door in set position, and means carried by the said body portion and disposed for engagement with the said door to lock the latter immovable when released by the said trigger, as and for the purpose set forth.

3. A device of the character described comprising a body portion, a door frame hingedly connected at one end of said body portion and having an opening formed therein, a trap door pivotally mounted to the said first mentioned door within the said opening, a trigger carried by said first mentioned door adapted to fit between the top of the trap door and the said first mentioned door for holding the former partly open, and means carried by said trap door whereby the outward movement thereof is limited when the said trigger has been operated, as and for the purpose set forth.

4. In a poultry trap nest, the combination of a body portion having a door frame hingedly connected thereto at one end thereof, a trap door pivoted to and within the said frame, a grooved trigger member adapted to be interposed between the upper extremity of the door and the adjacent portion of the door frame to normally maintain the said door in set position, the respective edges of the said door and door frame being seated within the grooves of the said trigger, means carried by the said body portion to limit the pivotal movement of the door, and spring means disposed for engagement with the said door to lock the latter in closed position, the trigger having been previously removed from between the said door and door frame.

5. In a poultry trap nest, the combination of a body portion, a door frame hingedly connected to one end thereof, a trap door pivotally mounted to and within the said frame, a removable trigger carried by the said door frame adapted to be interposed between the upper extremity of the door and the adjacent portion of the said frame, the said trigger having a groove formed longitudinally in the respective edges thereof, the grooves adapted to engage respectively the said door and a portion of the said frame to normally maintain the former at an inclination with respect to the said frame, stop means secured to the door and disposed for engagement with the said frame to limit the pivotal movement of the former in one direction, an upright member positioned directly beneath the lower extremity of the door, the latter being swung into set position, the said cross piece forming a barrier and causing the fowl to engage the said door to automatically unseat the trigger during such engagement, and means including an exteriorly operated spring member for automatically locking the door in closed position, as and for the purpose set forth.

6. A device of the character described comprising a body portion, a door frame hingedly connected at one end thereof and having an opening formed therein, a trap door pivotally mounted upon said first mentioned door within the said opening, a trigger carried by said first mentioned door adapted to fit between the top of said trap door and the upper edge of said hinged door and within the said opening for setting the trap door in set position, a stop plate carried by said trap door for limiting the outward movement thereof when in closed position, a spring carried by said body portion adapted to engage the said trap door for holding the same in closed position, and means secured to said spring whereby the trap door may be released for re-setting the trap, as and for the purpose set forth.

JOHN M. SARGENT.

Witnesses:
WALTER S. PRESNAL,
ANDREW S. VENESKE.